United States Patent
Szentkiralyi et al.

(10) Patent No.: US 10,011,157 B2
(45) Date of Patent: Jul. 3, 2018

(54) VISOR FOR CONTINUOUSLY EXTENDED WINDSHIELD

(71) Applicant: Tesla Motors, Inc., Palo Alto, CA (US)

(72) Inventors: Miklos Szentkiralyi, San Jose, CA (US); Craig Cochrane, Fremont, CA (US); Jorge Fialho, Los Altos, CA (US); Derek Allen, Los Altos, CA (US); Joonas Vartola, Santa Monica, CA (US); Franz Von Holzhausen, Malibu, CA (US)

(73) Assignee: TESLA, INC., Palo Alto, CA (US)

( * ) Notice: Subject to any disclaimer, the term of this patent is extended or adjusted under 35 U.S.C. 154(b) by 379 days.

(21) Appl. No.: 14/803,747

(22) Filed: Jul. 20, 2015

(65) Prior Publication Data
US 2017/0021703 A1  Jan. 26, 2017

(51) Int. Cl.
*B60J 3/02* (2006.01)
*B60Q 3/82* (2017.01)
*B60Q 3/252* (2017.01)

(52) U.S. Cl.
CPC ........... *B60J 3/0282* (2013.01); *B60J 3/023* (2013.01); *B60J 3/0208* (2013.01); *B60Q 3/252* (2017.02); *B60Q 3/82* (2017.02)

(58) Field of Classification Search
CPC . B60J 3/02; B60J 3/0204; B60J 3/0208; B60J 3/0213; B60J 3/0217; B60J 3/023; B60Q 3/252
USPC ....................................... 296/97.1, 97.7–97.9
See application file for complete search history.

(56) References Cited

U.S. PATENT DOCUMENTS

| | | | | |
|---|---|---|---|---|
| 3,825,296 A * | 7/1974 | Peterson | ................ | B60J 3/0208 16/224 |
| 4,570,991 A * | 2/1986 | Lystad | ................... | B60J 3/0208 296/97.8 |
| 4,614,375 A * | 9/1986 | Miller | .................... | B60J 3/0204 296/97.8 |
| 4,888,072 A * | 12/1989 | Ohlenforst | ............ | B60J 3/0204 156/108 |
| 4,940,273 A * | 7/1990 | Konishi | ................. | B60J 3/0208 296/97.6 |
| 4,974,896 A * | 12/1990 | Konishi | ................. | B60J 3/0208 296/97.6 |
| 5,135,279 A * | 8/1992 | Beatty | ..................... | B60J 1/205 160/171 |
| 7,513,560 B2 * | 4/2009 | Lin | ........................ | B60J 3/0204 296/97.2 |
| 9,248,721 B1 * | 2/2016 | Forgette | ................. | B60J 3/0213 |
| 2004/0145209 A1 * | 7/2004 | Peterson | ................ | B60J 3/0208 296/97.11 |
| 2006/0125277 A1 * | 6/2006 | Maharaj | ................. | B60J 3/0208 296/97.8 |
| 2009/0315361 A1 * | 12/2009 | Glaser | ................... | B60J 1/2063 296/97.8 |

(Continued)

*Primary Examiner* — Gregory A Blankenship
(74) *Attorney, Agent, or Firm* — Garlick & Markison; Bruce E. Garlick

(57) ABSTRACT

A vehicle includes: a front windshield that continuously extends along an A-pillar so as to form a partial roof of the vehicle above a driver area; a visor having a proximate end hinged to the A-pillar so as to assume a stowed position along the A-pillar; and on the front windshield, an attachment configured to selectively engage a distal end of the visor in a deployed position.

20 Claims, 8 Drawing Sheets

(56) References Cited

U.S. PATENT DOCUMENTS

| | | | |
|---|---|---|---|
| 2011/0233958 A1* | 9/2011 | Rhine | B60J 3/0208 |
| | | | 296/97.1 |
| 2013/0033060 A1* | 2/2013 | Marcus | B60J 3/0208 |
| | | | 296/97.8 |
| 2013/0082479 A1* | 4/2013 | Marcus | B60J 3/0208 |
| | | | 296/97.8 |
| 2014/0091592 A1* | 4/2014 | Dolisy | B60J 3/023 |
| | | | 296/97.9 |
| 2017/0021703 A1* | 1/2017 | Szentkiralyi | B60J 3/0208 |
| 2017/0225546 A1* | 8/2017 | Juarez Corona | B60J 3/0217 |

* cited by examiner

VISOR FOR CONTINUOUSLY EXTENDED WINDSHIELD

BACKGROUND

Most vehicles are made from a metal frame that serves as the main structure on which all other vehicle components or parts are mounted. In cars, the frame usually defines an opening from the passenger compartment toward a front of the vehicle. In assembly, a front windshield is mounted onto the frame so as to cover the opening. The upper end of the opening is usually marked by a so-called headliner frame element, or header for short. This header forms the front end of the vehicle's roof. Although moon roofs or other transparent roof panels are used on some vehicles, the rest of the roof is generally opaque. That is, the header forms a visual boundary such that the driver (or a front seat passenger) can only see out of the vehicle below the header.

Because the header is positioned immediately above the windshield it has become customary to mount certain vehicle components to this structure. For example, most cars have a driver side visor and a passenger side visor attached to the header. Each visor usually has a hinge attachment at one end and a clip attachment at the other end. Often, both the hinge and the clip are attached directly or indirectly to the header. The hinge, which is usually the outboard of the two attachments, typically allows the visor to be rotated to a position parallel with the side window to block light from the side.

Traditional visors can either be stowed, when they lie flat against the interior roof, or deployed, when they are flipped down to partially block out incoming light. While stowed, the visors are usually not considered a significant visual distraction, mainly because the stowed visor is simply covering a part of the interior roof that is not transparent anyway.

SUMMARY

In a first aspect, a vehicle includes: a front windshield that continuously extends along an A-pillar so as to form a partial roof of the vehicle above a driver area; a visor having a proximate end hinged to the A-pillar so as to assume a stowed position along the A-pillar; and on the front windshield, an attachment configured to selectively engage a distal end of the visor in a deployed position.

Implementations can include any or all of the following features. The attachment and the distal end engage each other by way of at least a first magnet. Each of the attachment and the distal end has a respective magnet. The first magnet is mounted in a reciprocating arrangement that includes at least a retracted position where the first magnet is inside a housing, and an extended position where the first magnet at least partially extends through an opening in the housing so as to cause the attachment and the distal end to engage each other. The first magnet mounted in the reciprocating arrangement is located on the distal end of the visor. The vehicle further comprises a second magnet on the attachment, the second magnet being fixed and positioned behind a cover on the attachment. The reciprocating arrangement comprises a spring that is positioned so as to withdraw a plunger away from the opening toward the retracted position, the plunger having a cap that holds the first magnet towards the opening. The first magnet has an engagement surface that is substantially flush with the opening when in the retracted position. The vehicle further comprises a second magnet on the A-pillar, the second magnet positioned so as to engage the first magnet when the visor is in the stowed position. The visor comprises a primary blade that is narrower than the A-pillar, thereby accommodating the stowed position, the visor further comprising a secondary blade that is hinged to the primary blade for selectively making the visor wider. The vehicle further comprises: a mirror that is mounted on the primary blade so as to be covered by the secondary blade when the visor is folded; and a cloth attached at a hinge portion of the primary and secondary blades, the cloth configured to selectively cover and reveal the mirror. The vehicle further comprises a magnet on at least one of the cloth and the primary blade, the magnet configured for holding the cloth onto the primary blade. The vehicle further comprises: one or more LEDs positioned behind the mirror on the primary blade; a light guide positioned to guide light from the LEDs to a surface of the primary blade; and a switch controlled by the magnet, the switch configured so that the LEDs are turned off when the cloth covers the mirror, and turned on when the cloth does not cover the mirror. A trim element on the A-pillar has a hollow portion for accommodating the visor in the stowed position. The visor is a driver side visor, the vehicle further comprising a passenger side visor that is a mirror image of the driver side visor. The attachment comprises a base on which a rear view mirror is also mounted. The vehicle is configured to compensate for a stack-up of cross-vehicle tolerance relating to at least the A-pillar, the hinge, the blade and the attachment.

In a second aspect, a visor includes: a blade; a hinge at a proximal end of the blade; and a magnet assembly at a distal end of the blade, comprising: a magnet mounted in a reciprocating arrangement that includes at least a retracted position where the magnet is inside a housing of the blade, and an extended position where the first magnet at least partially extends through an opening in the housing; a plunger having a cap that holds the magnet towards the opening; and a spring that is positioned so as to withdraw the plunger away from the opening toward the retracted position.

Implementations can include any or all of the following features. The magnet has an engagement surface that is substantially flush with the opening when in the retracted position.

In a third aspect, a visor includes: a blade; a hinge at a proximal end of the blade, the hinge configured for attachment to an A-pillar of a vehicle; and at a distal end of the blade, means for selectively engaging the visor and an attachment positioned on a front windshield to each other, and for compensating for a stack-up of cross-vehicle tolerance relating to at least the A-pillar, the hinge, the blade and the attachment.

DETAILED DESCRIPTION

This document describes examples of systems and techniques relating to visors that provide desirable visibility when stowed and that have advantages regarding manufacturing and assembly. Embodiments can be used in vehicles where the windshield is not interrupted by a traditional header, but where the front window rather continually extends upward over the driver's head so as to form part of the vehicle's roof. This provides the front-seat occupant a greatly improved field of view. In such a vehicle, if the stowed visor were positioned in the traditional way—that is, horizontally across what is otherwise the header area—it would block a portion of the enlarged field of view and therefore be a significant visual distraction. It is therefore more desirable to anchor the visor on the A-pillar, which is a frame component that extends upward from the lower vehicle frame toward the roof. Thereby, the stowed position of the visor can be along the A-pillar so as to not obstruct the view. In other words, the front seat occupant may not see the visor while it is in the stowed position because it is located outside the normal field of vision.

Another challenge relates to manufacturing and assembly. Assume that the visor is hinged to the A-pillar and that a free end of the visor can be rotated toward the interior rear view mirror. In the deployed position, the free end should be attached to the housing of that rear view mirror. Whichever type of attachment one uses, it is clear that if the visor is too long or too short for the actual distance between the anchor and the housing in a particular vehicle being built, one may not be able to securely attach the free end. For this reason, it would be advantageous to have a visor design that compensates for the manufacturing and assembly tolerances in the involved components.

Figure 1:
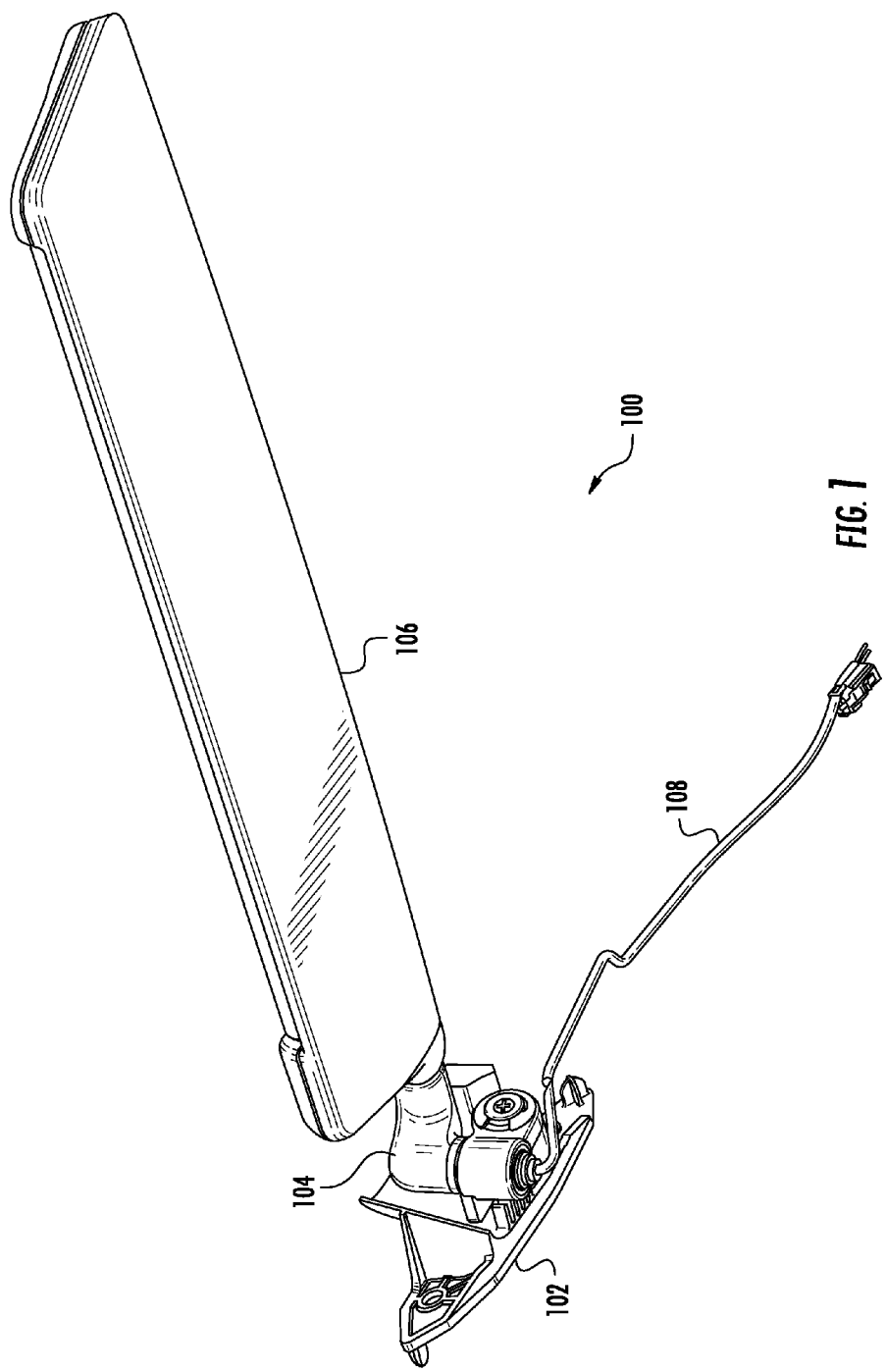
FIG. 1 shows an example of a visor.

FIG. 1 shows an example of a visor 100. The visor here has an anchor 102 that should be attached to the A-pillar of the vehicle, for example by bolts. Mounted on the anchor is a hinge 104 that allows the visor to be rotated in at least one degree of freedom relative to the anchor. A blade 106 of the visor is rotatable around an axis so as to allow the blade to be adjusted to different angles relative to the driver. A cable 108 provides power to one or more lights on the visor, for example as described below.

In the shown example, the visor is configured for attachment to the A-pillar that is on the left when viewed in the forward direction of the vehicle. In some countries such as the USA, this visor then serves the person in the driver seat. A front seat passenger (e.g., in a right-hand seat) can have a corresponding visor on their side of the vehicle.

Figure 2:
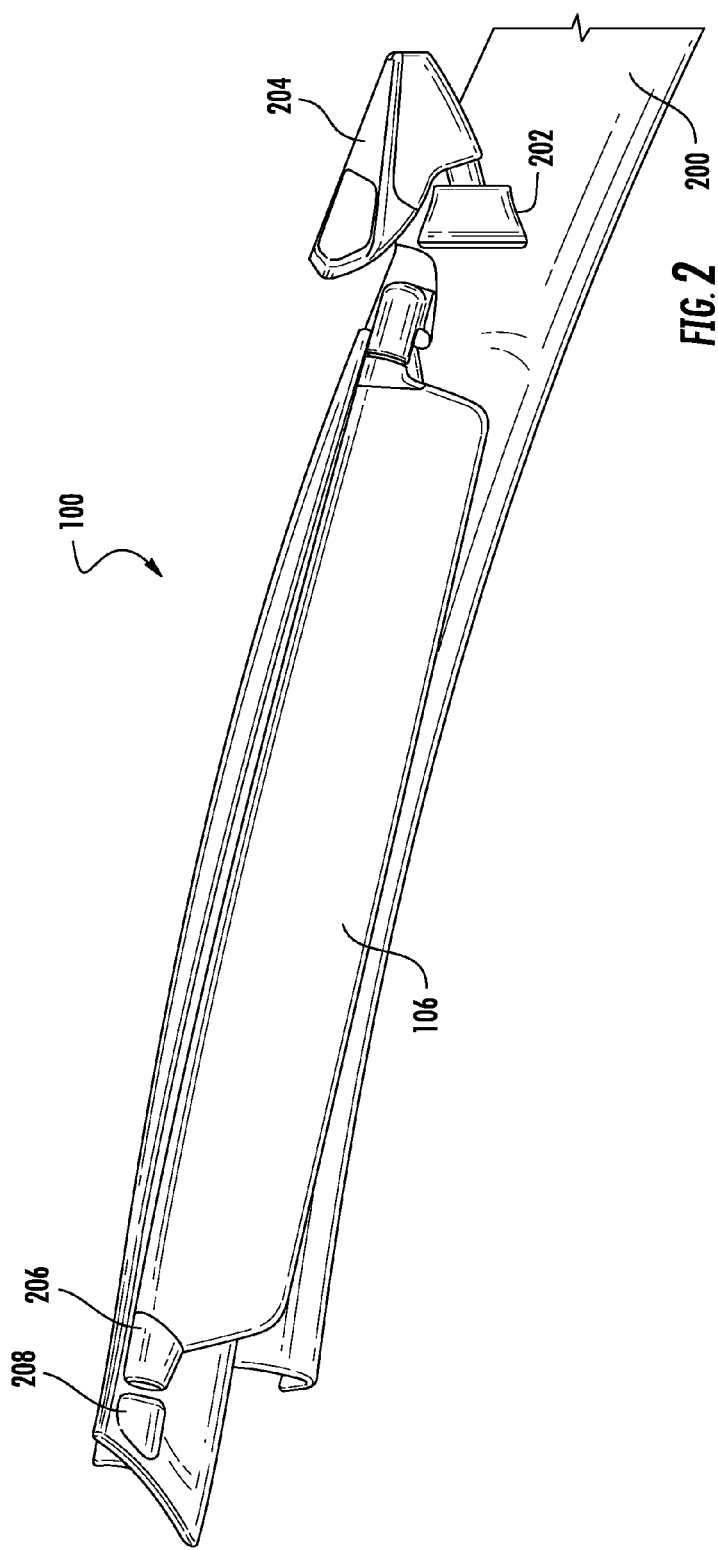
FIG. 2 shows an example of the visor of FIG. 1 in a stowed position.

FIG. 2 shows an example of the visor 100 of FIG. 1 in a stowed position. Here, the visor is hinged to an A-pillar 200 and is currently stowed so that is extends along the A-pillar. In this example, the vehicle's left A-pillar is being shown. Also visible is an interior rear view mirror 202 that is mounted on a base 204. The base is attached to the interior surface of a front windshield (not shown). In some implementations, the base also serves as a housing for one or more other components, such as a forward facing camera or other detection component.

The visor here has a magnet assembly 206 at its free end—that is, the end that moves if the visor is deployed, by rotating it toward the rear view mirror. The base serves as an attachment for the visor by selectively engaging a distal end thereof in a deployed position. In this example the A-pillar has a fixed magnet 208 that holds one end of the visor while in the stowed position.

Here, the blade 106 is narrower than the width of the A-pillar. This allows the A-pillar to accommodate the visor while in the stowed position.

The vehicle's right side A-pillar can have a corresponding visor mounted thereon. In some implementations, that visor is essentially a mirror image of the visor 100. For example, the base 204 can also be configured to selectively engage the right-hand visor in a deployed position.

Figure 3:
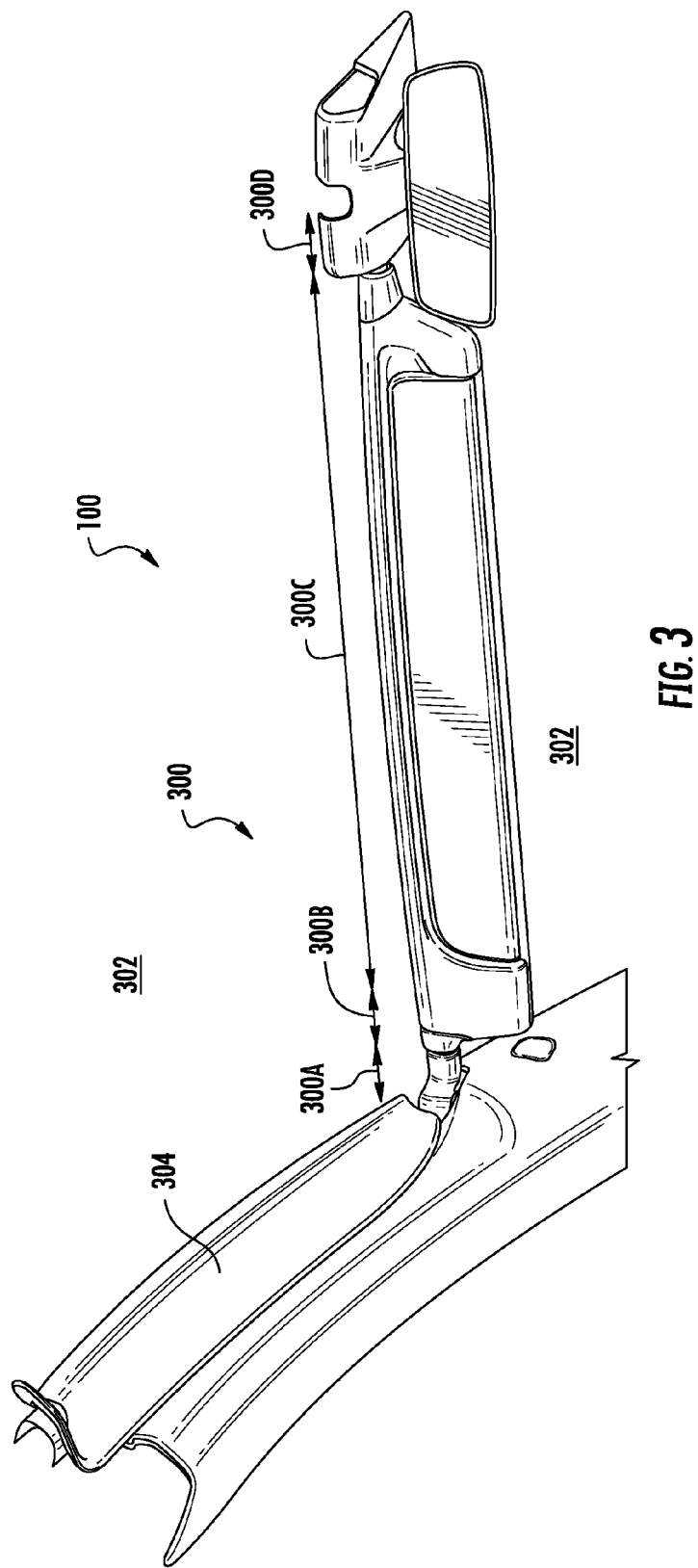
FIG. 3 shows an example of the visor of FIG. 1 in a deployed position.

FIG. 3 shows an example of the visor 100 of FIG. 1 in a deployed position. Here, various manufacturing and assembly tolerances 300 are schematically represented by arrows. Particularly, arrow 300A represents the tolerance of the A-pillar and its position. An arrow 300B represents the tolerance of the hinge and its position on the A-pillar. An arrow 300C represents the tolerance in the length of the visor (i.e., from one end to the other). An arrow 300D represents the tolerance in the dimensions of the mirror base and its position on the windshield. That is, the tolerances represent the respective spreads in position and dimension of the various components that inherently occur due to manufacturing and assembly procedures.

These tolerances can in a sense all "stack up"—that is, they collectively affect how long the visor will be from end to end. The arrows in this example are aligned with each other to illustrate the effect of stacking, with it being understood that tolerance can be specified in all dimensions. That is, if each of the aspects corresponding to the tolerances 300 is longer than intended this causes the visor to be longer by the sum of those lengths. Conversely, if each of them is shorter than specified, the resulting visor will be shorted by a corresponding amount. Implementations of the present disclosure can seek to compensate for such stackup of tolerances, such as by the particular reciprocating magnetic assembly described below.

A front windshield 302 is indicated. The front windshield does not have a traditional header or headliner that interrupts its height. Rather, the windshield extends along the A-pillar so as to form a partial roof of the vehicle above the driver area. Typically, the windshield is symmetric so that both the driver and front passenger have a full field of view forward as well as upward.

Here, the A-pillar is covered by a trim element. In particular, the trim element has a hollow portion 304. For example, this can accommodate the visor in the stowed position. As another example, the hollow portion can accommodate a person's hand or fingers when grasping the visor.

Figure 4:
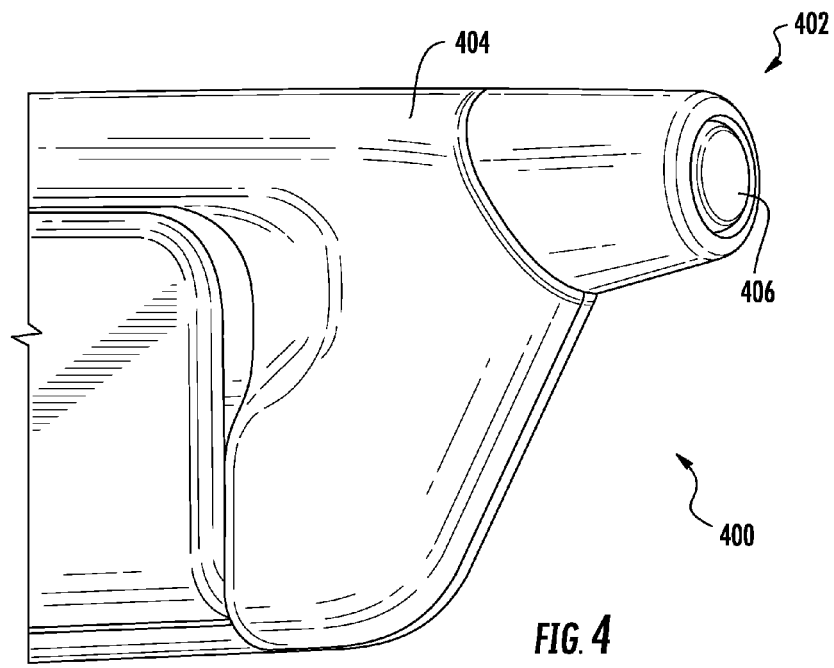
FIG. 4 shows an example of a distal end of the visor of FIG. 1.

FIG. 4 shows an example of a distal end 400 of the visor of FIG. 1. In some implementations, one or more magnet assemblies 402 can be used for providing engagement between the distal end and an attachment (e.g., FIG. 3) in a deployed position. Any form of magnet can be used, including, but not limited to, a button magnet.

The visor has a housing 404 that forms the visor blade and also at least partially encloses the magnet. In some implementations, the magnet is mounted on the distal end of the visor in a reciprocating arrangement that allows the magnet to selectively extend from, or retract into, the distal end. For example, when the magnet is not engaged by any other material, it remains in the retracted position. Here, the magnet has an engagement surface 406 that is substantially flush with an opening in the housing when in the retracted position.

On the other hand, when the magnet is engaged by an external magnet or ferromagnetic material, the magnetic force causes the magnet to move to the extended position where it at least partially emerges through the opening in the housing.

Figure 5:
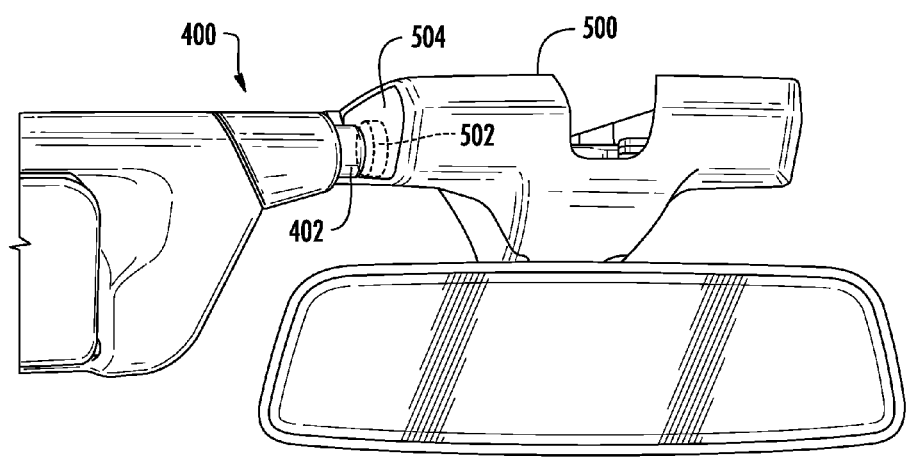
FIG. 5 shows an example of engagement between the distal end of FIG. 4 and a base.

In some implementations, there is a respective magnet at each of the distal end and the attachment, for example as will now be described. FIG. 5 shows an example of engagement between the distal end of FIG. 4 and a base 500. The base is mounted on the inside of the front windshield, essentially in a central position between the front seats. The base can have a magnet 502 facing the visor. The magnet 502 is here positioned behind a surface 504. For example, the surface 504 allows interaction between the magnets and has the same color and texture as the rest of the base.

As mentioned, the magnet 402 in the visor remains retracted when not engaged by another material. That is, while the visor is being deployed—that is, having one of its ends rotated toward the base on the windshield—the magnet 402 inside the visor is generally not noticeable (except for its engagement surface which can sit flush with the opening). This preserves a clean look of the visor assembly and also gives the distal end thereof a more rounded shape that is less likely to cause damage.

However, when a person brings the visor to the deployed position, the magnet 402 will be positioned near or directly in front of the magnet 502 in the attachment 500. This causes the two magnets to interact with each other, which in turn extracts the magnet 402 at least partially out of the visor housing. That is, the magnet 402 is then drawn into close proximity of the magnet 502, thereby holding the visor in the deployed position by way of magnetic force. The magnet 402 can rest against the surface 504 when the visor is in the deployed position. The occurrence of this physical contact by magnetic force can serve as a tactile feedback to the person who is moving the visor, signaling that the visor is in the correct location for the deployed position and is now secured in place.

Figure 6:
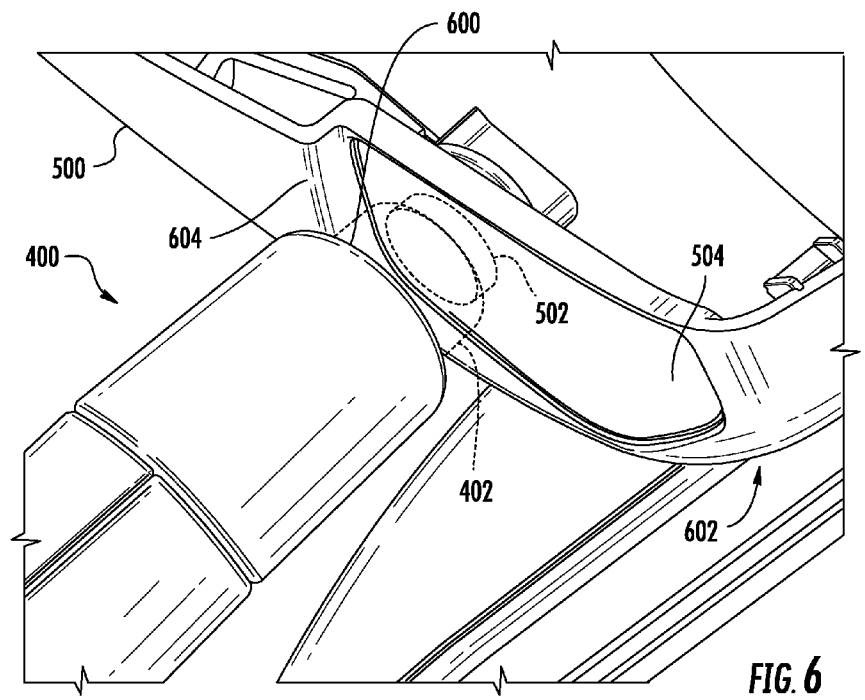
FIG. 6 shows another example of engagement between the distal end and the base.

FIG. 6 shows another example of engagement between the distal end 400 and the base 500. Here, the magnets 402 and 502 are positioned directly opposite each other, with the magnet 402 abutting the surface 504. That is, the reciprocal arrangement here allows the magnet 402 to travel the necessary distance toward the magnet 502 to make a full engagement—in this case with the surface 504. This ability serves to compensate for some of the dimensional differences from one vehicle to another that result from the tolerances of the visor and the related components. In contrast, a front edge 600 of the distal end 400 is positioned so that it clears both a leading edge 602 of the base and a corner 604 that protrudes further back on the base. This clearance seeks to ensure that even if a particular visor ends up somewhat longer than most (within the specified tolerances) its front edge should nevertheless not hit any part of the base. Rather, the flexible travel length of the magnet 402 compensates for such variations.

Figure 7:
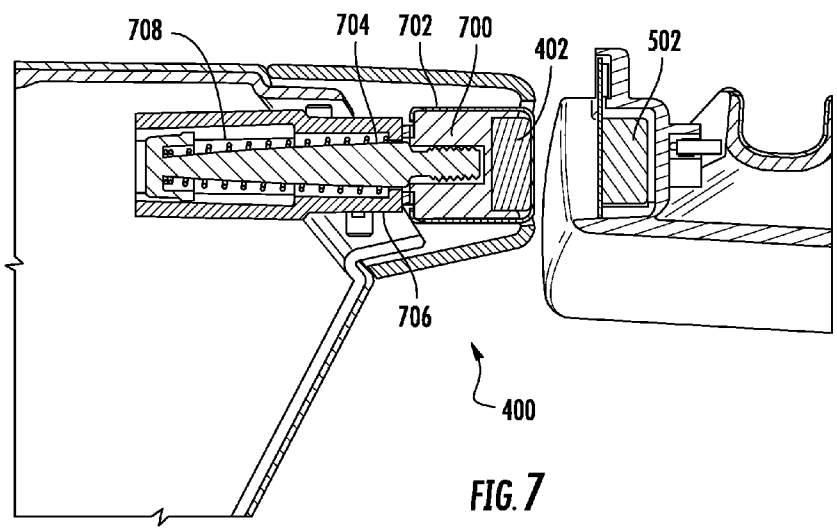
FIG. 7 shows a cross section of the distal end of FIG. 4.

FIG. 7 shows a cross section of the distal end 400 of FIG. 4. The magnet 402 is positioned in a holder 700 and they are in turn enclosed by a cap 702. The holder is mounted on a plunger 704 that extends into a housing 706. The plunger is biased in a direction into the housing by a spring 708.

When there is minimal or no interaction between the magnet 402 and another object (e.g., the magnet 502), the magnet 402 is held in the retracted position by the spring acting on the plunger. However, when the interaction is sufficiently strong to overcome the bias of the spring, the magnet 402 is extracted from the visor housing toward the other object.

To retrieve the visor from the deployed position, the person simply grasps the visor and gently pulls it. This motion overcomes the force of the engagement between the magnets and allows the distal end of the visor to be separated from the base on the windshield. When the magnetic interaction is interrupted, the spring that biases the plunger inward again retracts the magnet 402 into the visor housing.

The stowed position, in turn, also uses magnetic interaction in some implementations. For example, a fixed magnet 208 is shown in FIG. 2.

Figure 8:
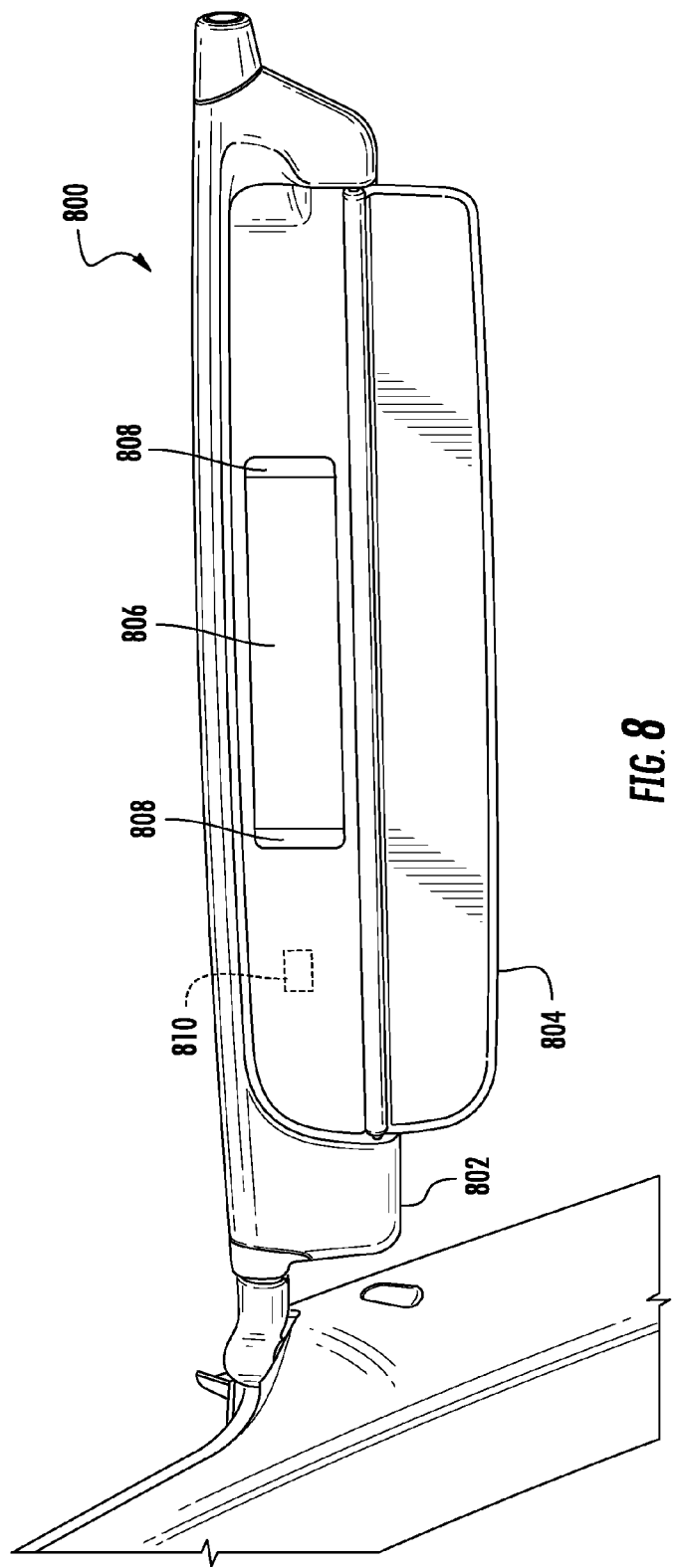
FIG. 8 shows an example of a visor in an unfolded position.

FIG. 8 shows an example of a visor 800 in an unfolded position. The visor includes a primary blade 802 and a secondary blade 804. The secondary blade is hinged to the primary blade and is currently unfolded so as to block more incoming light than when the visor is folded. Particularly, because the stowed position of the visor is along the A-pillar, it is important that the width of the visor does not exceed that of the A-pillar. When the visor is deployed, however, a wider visor is useful to the front seat occupant.

The unfolded secondary blade reveals a vanity mirror 806 mounted on the primary blade. One or more light sources (not shown) are positioned behind the mirror. The light is guided from behind the mirror by respective light guides 808 that emerge on each side of the mirror. The light guides produce a homogeneous white surface that illuminates the person's face. The light guide is made from any material suitable for leading the light to the intended location, including, but not limited to a polycarbonate material. Placing the light source behind the mirror and leading the light by guides can provide for a very thin visor that takes up relatively little space when stowed. A switch 810 for the light source can be positioned on or behind the surface of the primary blade. Any suitable switch can be used, including, but not limited to, a Hall switch. In some implementations, the switch can be positioned elsewhere, such as behind the mirror.

Figure 9:
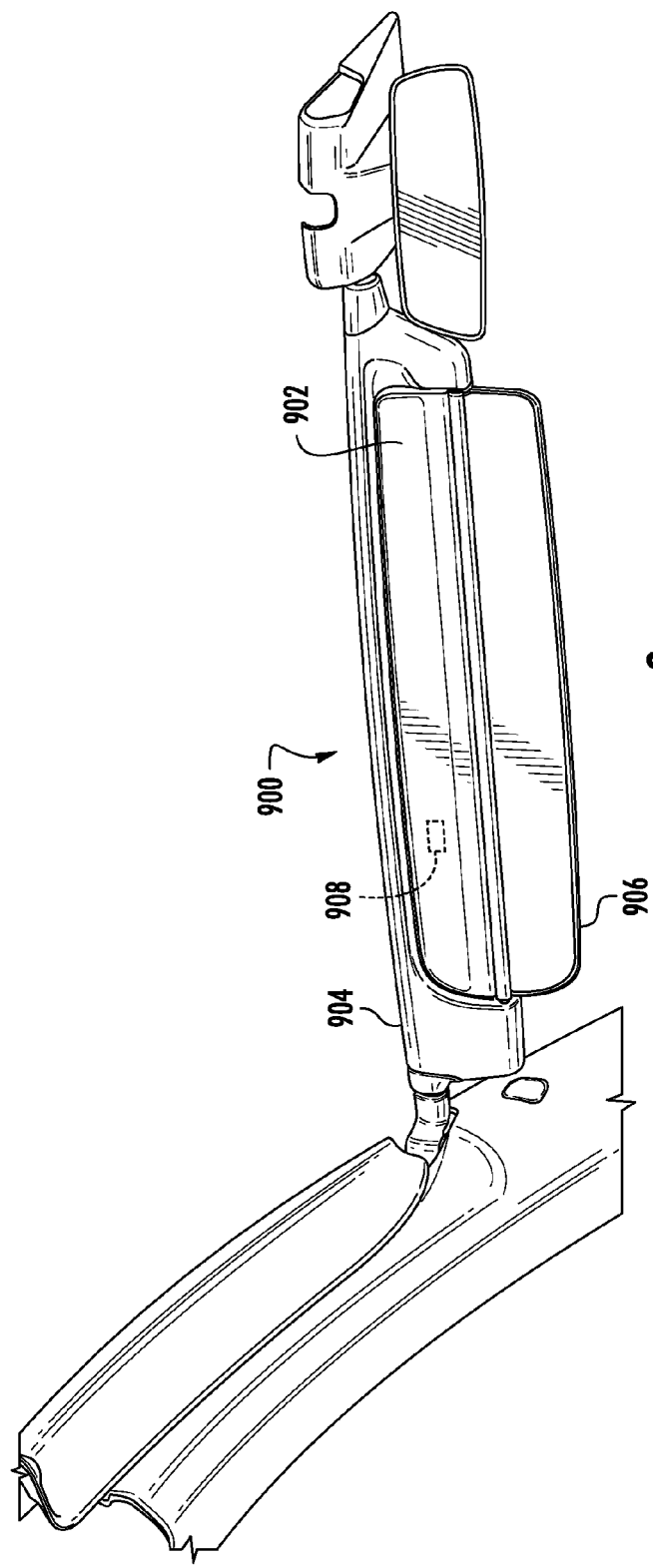
FIG. 9 shows an example of a visor having a cloth.

FIG. 9 shows an example of a visor 900 having a cloth 902. The visor also has a primary blade 904 and a secondary blade 906. On the primary blade, a vanity mirror (not shown) is mounted. To avoid having the mirror facing the person whenever the secondary blade is unfolded, the mirror can be covered by the cloth. For example, to obtain a wider visor the person can unfold the secondary blade and leave the cloth covering the vanity mirror. On the other hand, to use the vanity mirror the person can unfold both the secondary blade and the cloth. At least one magnet 908 can be used to hold the cloth in place onto the primary blade. The magnet can be positioned inside the cloth, or inside the primary blade when there is a metal plate on the cloth.

Figure 10:
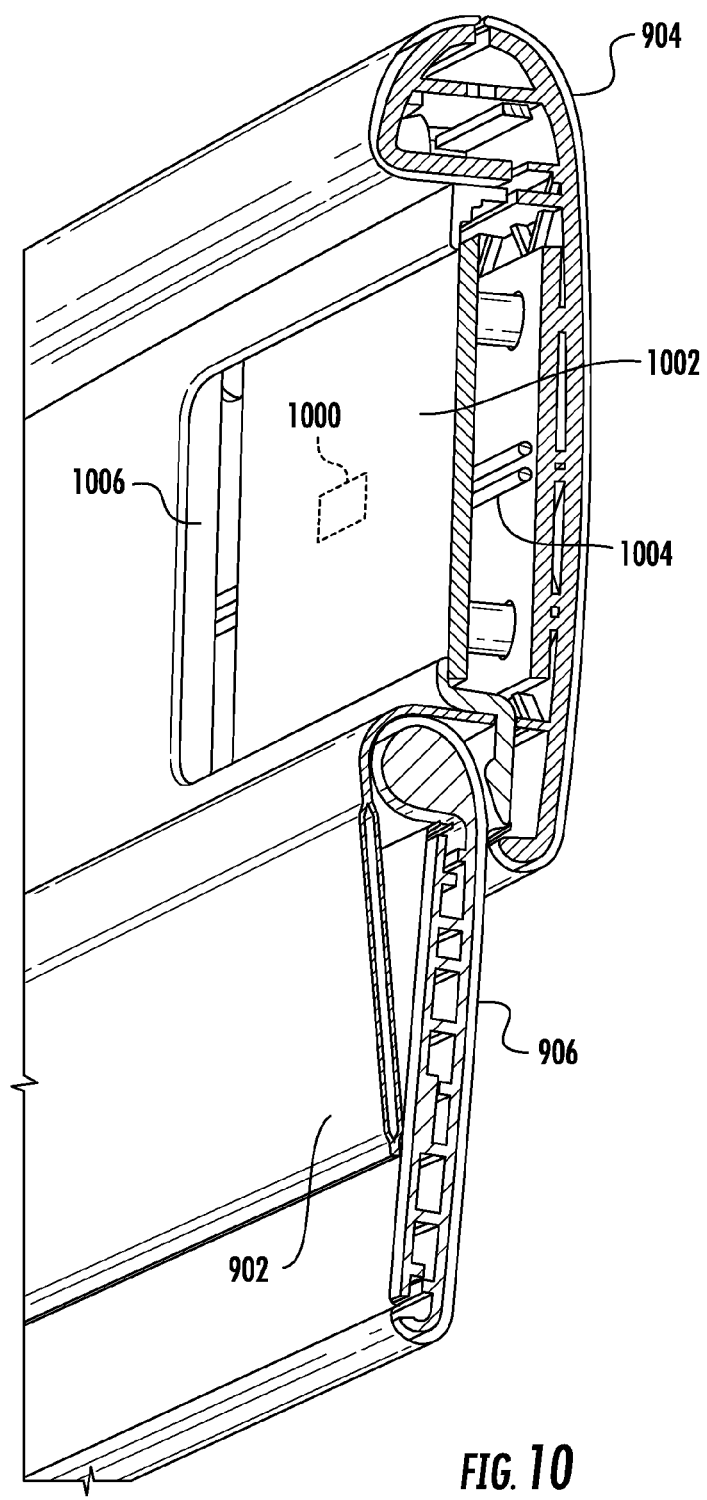
FIG. 10 shows a cross section of the visor in FIG. 9.

FIG. 10 shows a cross section of the visor in FIG. 9. The cloth can be attached at the hinge portion of the primary and secondary blades. One or more light sources 1000 is mounted behind a vanity mirror 1002. The light source is powered using wires 1004 which can be connected to the cable 108 shown in FIG. 1. The light from the light source is guided by light guide 1006. Some implementations use one or more LEDs as the light source. For example, edge lit LEDs can be used. Such a light source provides the advantages that it facilitates a relatively flat or small packaging of the visor components, and the light is distributed very evenly across the lit surface, as opposed to producing a hot spot of light from which the light intensity decays outward.

A number of implementations have been described as examples. Nevertheless, other implementations are covered by the following claims.

What is claimed is:

1. A vehicle comprising:
    a front windshield that continuously extends along an A-pillar so as to form a partial roof of the vehicle above a driver area;
    a visor having a proximate end hinged to the A-pillar so as to assume a stowed position along the A-pillar and a distal end having a housing with a first magnet mounted therein in a reciprocating arrangement; and
    on the front windshield, an attachment configured to engage the distal end of the visor in a deployed position,
    wherein in a retracted position the first magnet is inside the housing and, in an extended position, the first magnet at least partially extends through an opening in the housing to cause the distal end to engage the attachment.

2. The vehicle of claim 1, wherein the attachment includes a second magnet.

3. The vehicle of claim 1, further comprising a second magnet on the attachment, the second magnet being fixed and positioned behind a cover on the attachment.

4. The vehicle of claim 1, wherein the reciprocating arrangement comprises a spring that is positioned so as to withdraw a plunger away from the opening toward the retracted position, the plunger having a cap that holds the first magnet towards the opening.

5. The vehicle of claim 1, wherein the first magnet has an engagement surface that is substantially flush with the opening when in the retracted position.

6. The vehicle of claim 1, further comprising a second magnet on the A-pillar, the second magnet positioned so as to engage the first magnet when the visor is in the stowed position.

7. The vehicle of claim 1, wherein the visor comprises a primary blade that is narrower than the A-pillar, thereby accommodating the stowed position, the visor further comprising a secondary blade that is hinged to the primary blade for selectively making the visor wider.

8. The vehicle of claim 1, wherein a trim element on the A-pillar has a hollow portion for accommodating the visor in the stowed position.

9. The vehicle of claim 1, wherein the visor is a driver side visor, the vehicle further comprising a passenger side visor that is a mirror image of the driver side visor.

10. The vehicle of claim 1, wherein the attachment comprises a base on which a rear view mirror is also mounted.

11. The vehicle of claim 1, configured to compensate for a stack-up of cross-vehicle tolerance relating to at least the A-pillar, a visor hinge, a visor blade and the attachment.

12. A vehicle comprising:
    a front windshield that continuously extends along an A-pillar so as to form a partial roof of the vehicle above a driver area;
    a visor having:
        a proximate end hinged to the A-pillar so as to assume a stowed position along the A-pillar;
        a primary blade that is narrower than the A-pillar, thereby accommodating the stowed position;
        a secondary blade that is hinged to the primary blade for selectively making the visor wider;
        a mirror that is mounted on the primary blade so as to be covered by the secondary blade when the visor is folded; and
        a cloth attached at a hinge portion of the primary and secondary blades, the cloth configured to selectively cover and reveal the mirror; and
    on the front windshield, an attachment configured to engage a distal end of the visor in a deployed position.

13. The vehicle of claim 12, further comprising a magnet on at least one of the cloth and the primary blade, the magnet configured for holding the cloth onto the primary blade.

14. The vehicle of claim 13, further comprising:
    one or more LEDs positioned behind the mirror on the primary blade;
    a light guide positioned to guide light from the LEDs to a surface of the primary blade; and
    a switch controlled by the magnet, the switch configured so that the LEDs are turned off when the cloth covers the mirror, and turned on when the cloth does not cover the mirror.

15. A visor comprising:
    a blade;
    a hinge at a proximal end of the blade; and
    a magnet assembly at a distal end of the blade, comprising:
        a magnet mounted in a reciprocating arrangement that includes at least a retracted position where the magnet is inside a housing of the blade, and an extended position where the magnet at least partially extends through an opening in the housing;
        a plunger having a cap that holds the magnet towards the opening; and
        a spring that is positioned so as to withdraw the plunger away from the opening toward the retracted position.

16. The visor of claim 15, wherein the magnet has an engagement surface that is substantially flush with the opening when in the retracted position.

17. A visor comprising:
    a proximate end hinged to an A-pillar so as to assume a stowed position along the A-pillar;
    a primary blade that is narrower than the A-pillar, thereby accommodating the stowed position;
    a secondary blade that is hinged to the primary blade for selectively making the visor wider;
    a mirror that is mounted on the primary blade so as to be covered by the secondary blade when the visor is folded; and
    a cloth attached at a hinge portion of the primary and secondary blades, the cloth configured to selectively cover and reveal the mirror.

18. The visor of claim 17, further comprising a magnet on at least one of the cloth and the primary blade, the magnet configured for holding the cloth onto the primary blade.

19. The visor of claim 18, further comprising:
    one or more LEDs positioned behind the mirror on the primary blade;
    a light guide positioned to guide light from the LEDs to a surface of the primary blade; and
    a switch controlled by the magnet, the switch configured so that the LEDs are turned off when the cloth covers the mirror, and turned on when the cloth does not cover the mirror.

20. The visor of claim 17, wherein a trim element on the A-pillar has a hollow portion for accommodating the visor in the stowed position.

* * * * *